United States Patent
Cho et al.

(10) Patent No.: US 9,846,516 B2
(45) Date of Patent: Dec. 19, 2017

(54) OPTICAL TOUCH SYSTEM AND USING METHOD THEREOF

(71) Applicant: Wistron Corporation, New Taipei (TW)

(72) Inventors: Ching-An Cho, New Taipei (TW); Yu-Yen Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 100 days.

(21) Appl. No.: 14/937,834

(22) Filed: Nov. 10, 2015

(65) Prior Publication Data
US 2016/0216843 A1 Jul. 28, 2016

(30) Foreign Application Priority Data
Jan. 26, 2015 (TW) .............................. 104102538 A

(51) Int. Cl.
*G06F 3/042* (2006.01)
*G06F 3/041* (2006.01)
*G06F 3/0354* (2013.01)
*G06F 3/0488* (2013.01)

(52) U.S. Cl.
CPC ........ *G06F 3/0421* (2013.01); *G06F 3/03545* (2013.01); *G06F 3/0412* (2013.01); *G06F 3/04883* (2013.01); *G06F 2203/04808* (2013.01)

(58) Field of Classification Search
USPC ............... 345/175, 173, 156, 419, 166, 174; 250/208.1; 257/292
See application file for complete search history.

(56) References Cited

U.S. PATENT DOCUMENTS

| | | | |
|---|---|---|---|
| 2011/0157097 A1* | 6/2011 | Hamada .............. | G02F 1/13338 345/175 |
| 2012/0086673 A1* | 4/2012 | Chien .................. | G06F 3/0428 345/175 |
| 2012/0235987 A1* | 9/2012 | Lin ....................... | G06F 3/0421 345/419 |
| 2013/0155025 A1* | 6/2013 | Lai ....................... | G06F 3/0418 345/175 |
| 2015/0070327 A1* | 3/2015 | Hsieh ................... | G06F 3/0421 345/175 |
| 2015/0153899 A1* | 6/2015 | Kan ...................... | G06F 3/0418 250/208.1 |
| 2016/0026337 A1* | 1/2016 | Wassvik ................ | G06F 3/042 345/175 |

(Continued)

*Primary Examiner* — Thuy Pardo
(74) *Attorney, Agent, or Firm* — JCIPRNET

(57) ABSTRACT

An optical touch system includes a touch surface, a first light source and a first light-sensing unit. The first light source emits a first light. The first light is reflected at positions on a first section of the touch surface to form a first reference section at the first light-sensing unit. The first light is reflected at positions on a second section of the touch surface to form a second reference section at the first light-sensing unit. The second section is located between the first section and the first light-sensing unit. A touch object reflects the first light between the first section and the second section to produce a first input light region on the first reference section, or reflects the first light between the second section and the first light-sensing unit to produce a second input light region on the second reference section.

18 Claims, 6 Drawing Sheets

(56) References Cited

U.S. PATENT DOCUMENTS

| | | | | |
|---|---|---|---|---|
| 2016/0342281 A1* | 11/2016 | Kan | ................. | G06F 3/0418 345/175 |
| 2016/0342282 A1* | 11/2016 | Wassvik | ............. | G02F 1/13338 345/174 |
| 2017/0078513 A1* | 3/2017 | Chang | ................. | G06F 3/0488 257/292 |

* cited by examiner

OPTICAL TOUCH SYSTEM AND USING METHOD THEREOF

CROSS-REFERENCE TO RELATED APPLICATION

This application claims the priority benefit of Taiwan application serial no. 104102538, filed on Jan. 26, 2015. The entirety of the above-mentioned patent application is hereby incorporated by reference herein and made a part of this specification.

BACKGROUND OF THE INVENTION

1. Field of the Invention

The invention relates to a touch system and a using method thereof, and relates particularly to an optical touch system and a using method thereof.

2. Description of Related Art

Along with rapid developments in industrial technology, touch type electronic products have gradually become the mainstream trend in the market. Out of conventionally used resistive touch screens, capacitive touch screens and rear projection touch screens, the touch effects of a capacitive touch screen are the best, however the cost thereof is also the most expensive and increases along with the increasing size of the screen. Therefore, this limits the use of capacitive touch screens. Searching for an alternative to the capacitive touch screen, currently there is an optical touch screen which uses optical lenses to detect a touch position. The optical touch screen has advantages such as low cost and good accuracy, thus having an advantage in a competitive market and currently has become an alternative option for large sized touch screens.

In regards to a reflective optical touch screen, a plurality of sensing modules including a light source and a light sensing unit are disposed at a periphery of the screen of the reflective optical touch screen, and the touch object has light reflecting material. When the touch object performs a touch input to the screen, the light reflecting material of the touch object reflects a light provided by the light source back to the light sensing unit. Then sensing is performed and from there a position of the touch object is calculated. In this way, in optical touch technology, how to make the light reflected by the touch object fall within a range receivable by the light sensing unit is highly important. However, flattening a surface of a large sized touch screen is not easy, causing the light reflected to the light sensing unit to easily fall outside of the range receivable by the light sensing unit. In order to solve this problem, an area sensor with a larger light receiving range is selected to be adopted for the light sensing unit to replace a typical line sensor. The signal received by an area sensor is a two-dimensional (2D) signal and a 2D sensing image is produced. If analysis is performed on all of the 2D signals during the process of touch sensing, more time is easily consumed. Therefore, a suitable reference line may be first set in the 2D sensing image to perform analysis on the sensing signal according to the light falling on the reference line.

Bearing on the above, to prevent the touch object (such as a stylus) producing an excessive striking sound when performing touch input on the screen, a rubber pad and the like cushioning material used to contact the screen may be disposed on the touch object below the reflective material. However, the smaller the distance between the touch object and the light sensing unit, then the greater the area the cushioning material will take up in the 2D sensing image of the light sensing unit, which makes the reference line in the 2D sensing image to be covered or taken up by the cushioning material, causing the light reflected by the reflective material that arrives at the light sensing unit to be unable to fall on the reference line, thus producing an adverse influence for the touch sensing effects of the optical touch screen.

SUMMARY OF THE INVENTION

The invention provides an optical touch system and a using method thereof, having a good touch sensing effect.

The optical touch system of the invention includes a touch surface and a first sensing module. At least one touch object is adapted to perform touch input on the touch surface. The first sensing module is arranged at a periphery of the touch surface and includes a first light source and a first light-sensing unit. The first light-sensing unit is used to obtain a two-dimensional (2D) sensing image, the 2D sensing image has a first reference section and a second reference section. The first light source is adapted to emit a first light. The first light is reflected at a plurality of positions on a first section of the touch surface to produce a plurality of first reference light regions at the 2D sensing image of the first light-sensing unit, the first reference section is an area linking the first reference light regions. The first light is reflected at a plurality of positions on a second section of the touch surface to produce a plurality of second reference light regions at the 2D sensing image of the first light-sensing unit, the second reference section is an area linking the second reference light regions. The second section is located between the first section and the first sensing module. The at least one touch object is adapted to reflect the first light between the first section and the second section to produce a first input light region on the first reference section. The at least one touch object is adapted to reflect the first light between the second section and the first sensing module to produce a second input light region on the second reference section. The optical touch system obtains a location of the at least one touch object on the touch surface according to the first input light region or the second input light region.

In an embodiment of the invention, a border of the 2D sensing image of the first light-sensing unit corresponds to the touch surface, the at least one touch object has a reflective part and a cushioning part, the cushioning part is adapted to contact the touch surface to be positioned between the touch surface and the reflective part, when the at least one touch object is located between the first section and the second section, the reflective part is adapted to reflect the first light to produce a first touch light region at the 2D sensing image of the first light-sensing unit, when the at least one touch object is located between the second section and the first sensing module, the reflective part is adapted to reflect the first light to produce a second touch light region at the 2D sensing image of the first light-sensing unit, a distance between the second touch light region and the border is greater than a distance between the first touch light region and the border, the first reference section passes through the first touch light region to define the first input light region, the second reference section passes through the second touch light region to define the second input light region.

In an embodiment of the invention, the touch surface is rectangular and has a first side edge, a second side edge, a third side edge, a fourth side edge connected sequentially, and has a first vertex between the first side edge and the second side edge, has a second vertex between the second side edge and the third side edge, has a third vertex between the third side edge and the fourth side edge and has a fourth vertex between the fourth side edge and the first side edge.

In an embodiment of the invention, the first sensing module is arranged at the first vertex, the first section is made up by the third side edge and the fourth side edge, the second section is made up by a line connecting the fourth vertex and a switch point on the second side edge.

In an embodiment of the invention, the positions on the first section include the second vertex, the third vertex and the fourth vertex.

In an embodiment of the invention, the positions on the second section include the switch point and the fourth vertex.

In an embodiment of the invention, when the at least one touch object is located between the second vertex and a critical point on the second side edge, the at least one touch object is adapted to reflect the first light to produce a first touch light region at the 2D sensing image of the first light-sensing unit, and the first reference section passes through the first touch light region to define the first input light region, when the at least one touch object is located between the first vertex and the critical point on the second side edge, the at least one touch object is adapted to reflect the first light to produce a second touch light region at the 2D sensing image of the first light-sensing unit, the first reference section does not pass through the second touch light region, and the second reference section passes through the second touch light region to define the second input light region.

In an embodiment of the invention, the switch point coincides with the critical point.

In an embodiment of the invention, the positions on the second section further include any point on a line connecting the fourth vertex and the switch point.

In an embodiment of the invention, when the at least one touch object performs a touch input on the touch surface, the first light-sensing unit senses the at least one touch object only according to the first reference section or senses the at least one touch object only according to the second reference section.

In an embodiment of the invention, the optical touch system includes a second sensing module, wherein the second sensing module is arranged at the periphery of the touch surface, when the first light-sensing unit senses the at least one touch object only according to the first reference section and the second sensing module senses the at least one touch object is located between the second section and the first sensing module, the first light-sensing unit is switched to sense the at least one touch object only according to the second reference section, when the first light-sensing unit senses the at least one touch object only according to the second reference section and the second sensing module senses the at least one touch object is located between the first section and the second section, the first light-sensing unit is switched to sense the at least one touch object only according to the first reference section.

In an embodiment of the invention, the touch surface is rectangular, the first sensing module and the second sensing module are arranged at two adjacent vertexes of the touch surface respectively.

In an embodiment of the invention, a number of the at least one touch object is a plurality, when the touch objects perform touch inputs on the touch surface at the same time, the first light-sensing unit senses the touch objects according to the first reference section and the second reference section at the same time.

A using method of an optical touch system, wherein the optical touch system includes a touch surface and a first sensing module, the first sensing module includes a first light source and a first light-sensing unit, the first light source is adapted to emit a first light, the first light-sensing unit is used to obtain a 2D sensing image, at least one touch object is adapted to perform touch input on the touch surface. The using method includes the following steps. Reflecting the first light at a plurality of positions on a first section of the touch surface to produce a plurality of first reference light regions at the 2D sensing image of the first light-sensing unit, wherein an area linking the first reference light regions forms a first reference section. Reflecting the first light at a plurality of positions on a second section of the touch surface to produce a plurality of second reference light regions at the 2D sensing image of the first light-sensing unit, wherein an area linking the second reference light regions forms a second reference section, and the second section is located between the first section and the first sensing module. Reflecting the first light via the at least one touch object between the first section and the second section to produce a first input light region on the first reference section, or reflecting the first light via the at least one touch object between the second section and the first sensing module to produce a second input light region on the second reference section. Obtaining a position of the at least one touch object on the touch surface by the optical touch system according to the first input light region or the second input light region.

In an embodiment of the invention, a border of the 2D sensing image of the first light-sensing unit corresponds to the touch surface, the at least one touch object has a reflective part and a cushioning part, the cushioning part is adapted to contact the touch surface to be positioned between the touch surface and the reflective part, a method for producing the first input light region and the second input light region includes the following steps. When the at least one touch object is located between the first section and the second section, the first light is reflected by the reflective part to produce a first touch light region at the 2D sensing image of the first light-sensing unit. When the at least one touch object is located between the second section and the first sensing module, the first light is reflected by the reflective part to produce a second touch light region at the 2D sensing image of the first light-sensing unit, wherein a distance between the second touch light region and the border is greater than a distance between the first touch light region and the border, the first reference section passes through the first touch light region to define the first input light region, the second reference section passes through the second touch light region to define the second input light region.

In an embodiment of the invention, the using method includes the following steps. Sensing the at least one touch object by the first light-sensing unit only according to the first reference section or sensing the at least one touch object by the first light-sensing unit only according to the second reference section.

In an embodiment of the invention, the optical touch system includes a second sensing module, a method for sensing the at least one touch object by the first light-sensing unit only according to the first reference section or sensing the at least one touch object by the first light-sensing unit only according to the second reference section includes the following steps. When the first light-sensing unit senses the at least one touch object only according to the first reference section and the second sensing module senses the at least one touch object is located between the second section and the first sensing module, the first light-sensing unit is switched to sense the at least one touch object only according to the second reference section. When the first light-sensing unit senses the at least one touch object only according to the second reference section and the second sensing module senses the at least one touch object is located between the first section and the second section, the first light-sensing unit is switched to sense the at least one touch object only according to the first reference section.

In an embodiment of the invention, a number of the at least one touch object is a plurality, the method includes the following steps. When the touch objects perform touch inputs on the touch surface at the same time, the first light-sensing unit senses the touch objects according to the first reference section and the second reference section at the same time.

Based on the above, in an optical touch system of the invention, in addition to setting a first reference section in a 2D sensing image of a first light-sensing unit, here a second reference section is further set in the 2D sensing image, wherein the first reference section corresponds to a touch region (referred to as first touch region below) between the first section and the second section, and the second reference section corresponds to a touch region (referred to as second touch region below) between the second section and a first sensing module. In this way, under the circumstance where a cushioning part that is used to contact a touch surface is disposed below a reflective part of a touch object, if the touch object is located in the second touch region to be closer to the first light-sensing unit, which makes the space taken up by the cushioning part in the 2D sensing image of the first light-sensing unit larger and covers the first reference section, causing a light reflected by the reflective part that arrives at the first light-sensing unit to be unable to fall on the first reference section, then the optical touch system may be changed to perform sensing of the touch object according to the second reference section that is not covered by the space taken up by the cushioning part in the 2D sensing image, so as to solve the problem of the touch object being excessively close to the light-sensing unit and not able to be successfully sensed, making the optical touch system have good touch sensing effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
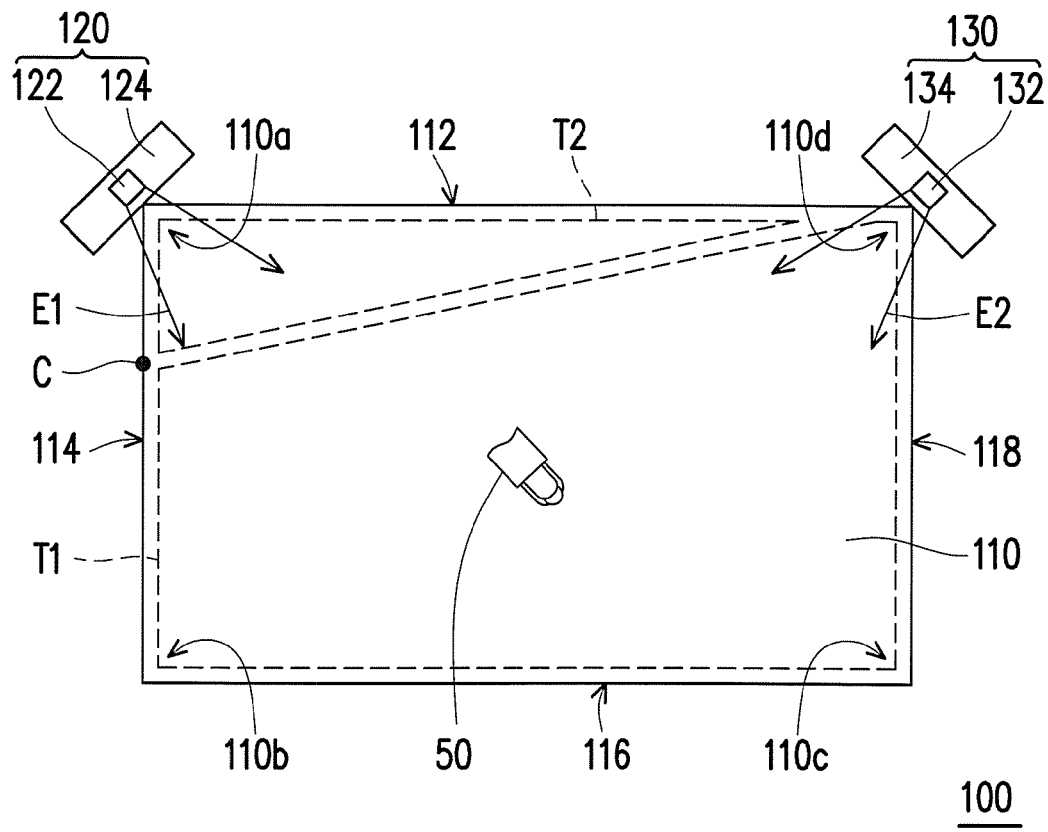
FIG. 1 is a schematic diagram of an optical touch system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an optical touch system according to an embodiment of the invention. Referring to FIG. 1, an optical touch system 100 of the embodiment, for example, is a reflective optical touch system and includes a touch surface 110, a first sensing module 120 and a second sensing module 130. The touch surface 110, for example, is a liquid crystal display (LCD), a light-emitting diode (LED) display, a field emission display (FED) or other type of touch display surface of displays and it should not be construed as a limitation to the invention. The touch object 50 (stylus, for example) is adapted to perform touch inputs on the touch surface 110.

The touch surface 110, for example, is rectangular and has a first side edge 112, a second side edge 114, a third side edge 116, a fourth side edge 118 connected sequentially, and has a first vertex 110a between the first side edge 112 and the second side edge 114, has a second vertex 110b between the second side edge 114 and the third side edge 116, has a third vertex 110c between the third side edge 116 and the fourth side edge 118 and has a fourth vertex 110d between the fourth side edge 118 and the first side edge 112.

The first sensing module 120 and the second sensing module 130 are arranged at a periphery of the touch surface 110 and located at two adjacent vertexes (shown disposed at the first vertex 110a and the fourth vertex 110d respectively) of the touch surface 110. The first sensing module 120 includes a first light source 122 and a first light-sensing unit 124. The second sensing module 130 includes a second light source 132 and a second light-sensing unit 134. The first light source 122 and the second light source 132, for example, are LEDs and adapted to emit a first light E1 and a second light E2 respectively. The first light-sensing unit 124 and the second light-sensing unit 134, for example, are area sensors and are used to sense the first light E1 reflected by the touch object 50 and the second light E2 reflected by the touch object 50 respectively to calculate the position of the touch object 50 on the touch surface 110.

For example, an angle that a line connecting the touch position and the first sensing module 120 forms with the first side edge 112 is obtained according to the first light E1 reflected by the touch object 50 and received by the first light-sensing unit 124, and an angle that a line connecting the touch position and the second sensing module 130 forms with the first side edge 112 is obtained according to the second light E2 reflected by the touch object 50 and received by the second light-sensing unit 134. In this way, the touch position is calculated by the two angles, wherein the optical touch system 100, for example, uses a processing unit thereof to perform the above calculation.

In the embodiment, the first light-sensing unit 124 and the second light-sensing unit 134, for example, senses light by a charge coupled device, a complementary metal-oxide semiconductor or other suitable type of light sensing element and it should not be construed as a limitation to the invention.

Figure 2:
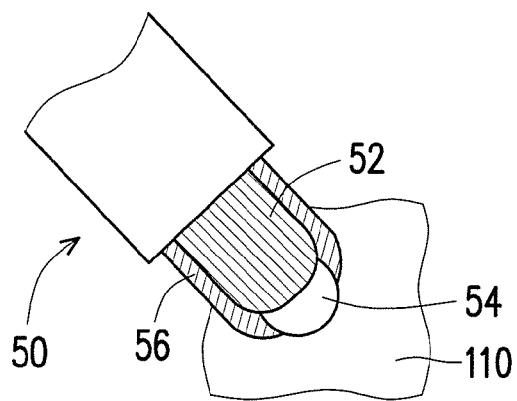
FIG. 2 is a partially enlarged diagram of a touch object of FIG. 1.

FIG. 2 is a partially enlarged diagram of a touch object of FIG. 1. In order to make the diagram clearer, a reflective part 52 and a transparent cover 56 in FIG. 2 are illustrated in cross-sectional view. As shown in FIG. 2, the touch object 50 has a reflective part 52, a cushioning part 54 and a transparent cover 56. The cushioning part 54, for example, is a rubber material or other suitable cushioning material and is disposed at an end of the reflective part 52, and the transparent cover 56 covers the reflective part 52 and a part of the cushioning part 54. When the touch object 50 performs a touch input to the touch surface 110, the cushioning part 54 contacts the touch surface 110 and is positioned between the touch surface 110 and the reflective part 52 to prevent an excessively large sound of the touch object 50 striking the touch surface 110. The first light E1 and the second light E2 shown in FIG. 1 may pass through the transparent cover 56 and reach the reflective part 52. The reflective part 52 is adapted to reflect the first light E1 and the second light E2 to the first light-sensing unit 124 and the second light-sensing unit 134 respectively in order to sense the position of the touch input.

Figure 3:
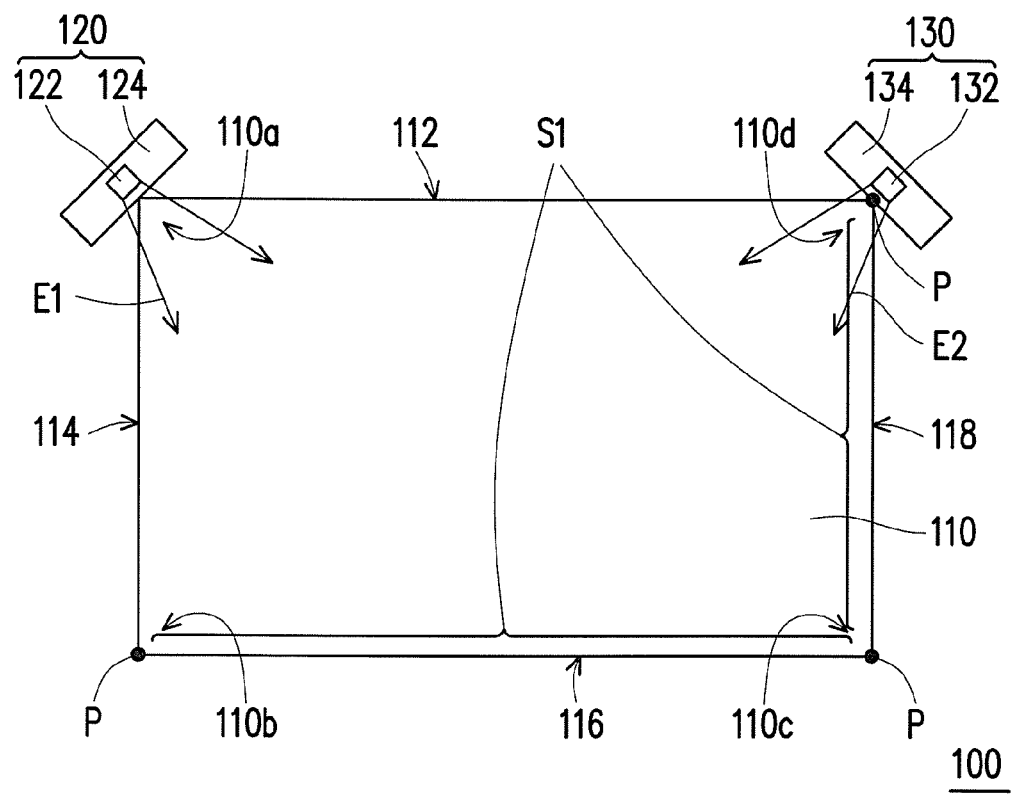
FIG. 3 illustrates positions on a first section of a touch surface.
Figure 4:
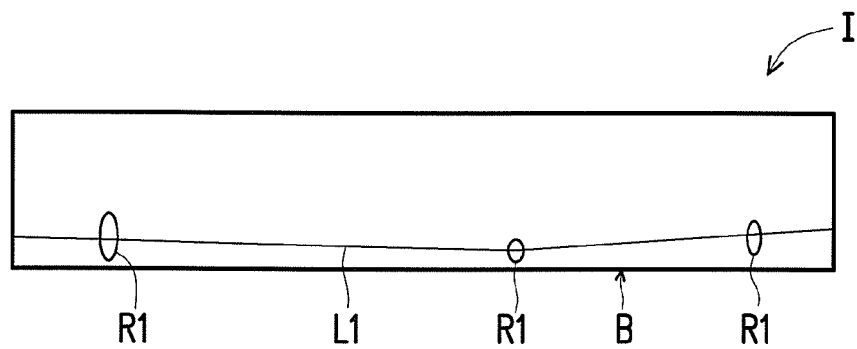
FIG. 4 illustrates a 2D sensing image of a first light sensing unit of FIG. 1 and a first reference section of the 2D sensing image.

FIG. 3 illustrates positions on a first section of a touch surface. FIG. 4 illustrates a 2D sensing image of a first light sensing unit of FIG. 1 and a first reference section of the 2D sensing image. A border B of a 2D sensing image I, for example, corresponds to the touch surface 110 of FIG. 1. The first light-sensing unit 124 is used to obtain the 2D sensing image I. The 2D sensing image I as shown in FIG. 4 has a first reference section L1 via the initial setup of the optical touch system 100, wherein the first reference section L1, for example, is a reference line, however the invention is not limited thereto. Below, the setup method of the first reference section is described. First a reflection material may be used to reflect the first light E1 at a plurality of positions P (labelled in FIG. 3) on a first section S1 of the touch surface 110 to produce a plurality of first reference light regions R1 at the 2D sensing image I of the first light-sensing unit 124. The first reference section L1 is an area linking the first reference light regions R1 as shown in FIG. 4. More specifically, for example, the first section S1 is made up by the third side edge 116 and the fourth side edge 118 of the touch surface 110, and the positions P on the first section S1, for example, are the second vertex 110$b$, the third vertex 110$c$ and the fourth vertex 110$d$ of the touch surface 110. In other embodiments, the first section S1 and the positions P on top thereof may be of other suitable setup methods and it should not be construed as a limitation to the invention. In addition, the first reference section L1, for example, may pass through a brightest point, a mid point or other suitable reference points of each of the first reference light regions R1 and it should not be construed as a limitation to the invention. In order to make the diagram clearer, the reflecting material is not illustrated in FIG. 3. The reflective material may be a reflective rod having reflective sheet strips or other suitable reflective component and adapted to be disposed at the positions P to reflect the first light E1, and it should not be construed as a limitation to the invention.

Figure 5:
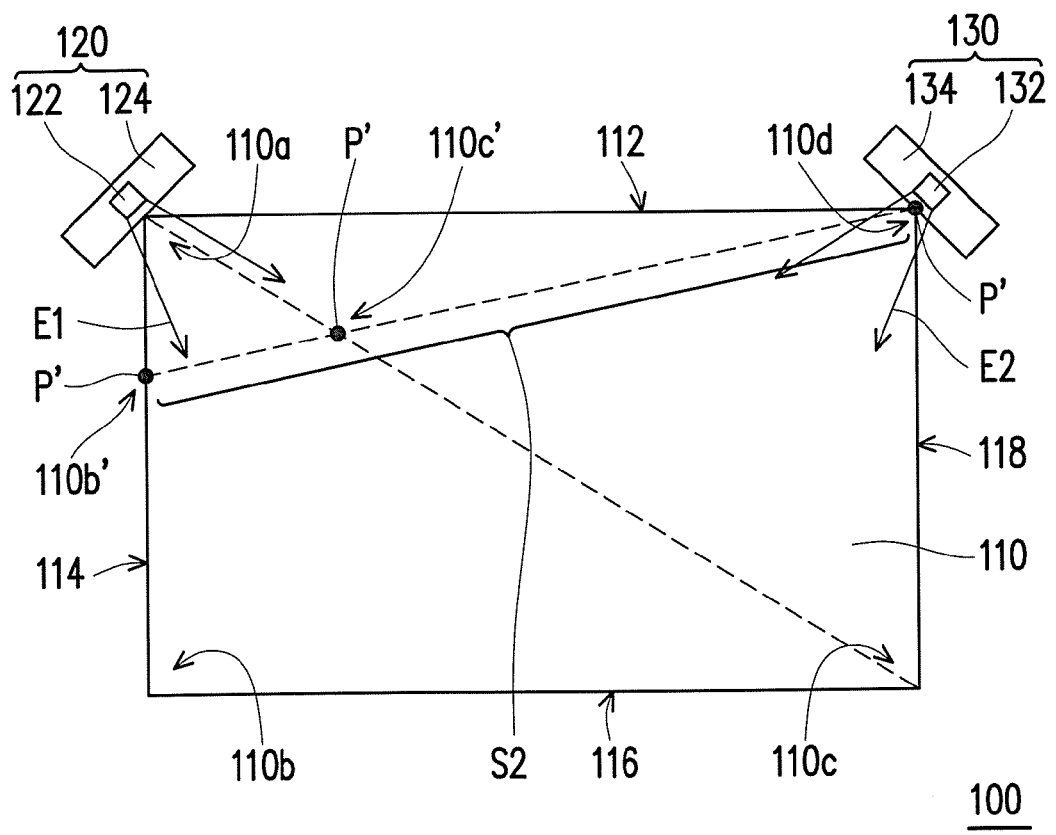
FIG. 5 illustrates positions on a second section of a touch surface.
Figure 6:
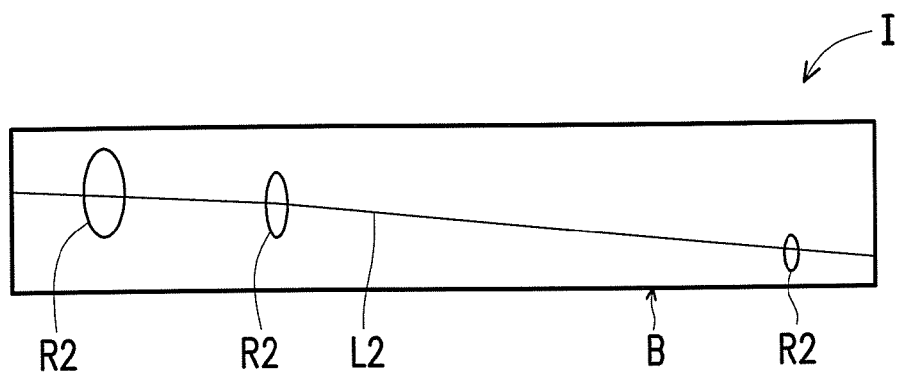
FIG. 6 illustrates a 2D sensing image of a first light sensing unit of FIG. 1 and a second reference section of the 2D sensing image.

FIG. 5 illustrates positions on a second section of a touch surface. FIG. 6 illustrates a 2D sensing image of a first light sensing unit of FIG. 1 and a second reference section of the 2D sensing image. Similarly, the 2D sensing image I as shown in FIG. 4 has a second reference section L2 via the initial setup of the optical touch system 100, wherein the first reference section L2, for example, is a reference line, however the invention is not limited thereto. Below, the setup method of the first reference section is described. First the reflection material may be used to reflect the first light E1 at a plurality of positions P' (labelled in FIG. 5) on a second section S2 of the touch surface 110 to produce a plurality of second reference light regions R2 at the 2D sensing image I of the first light-sensing unit 124. The second reference section L2 is an area linking the second reference light regions R2 as shown in FIG. 6. Wherein, the second section S2 (labelled in FIG. 5) is located between the first section S1 (labelled in FIG. 3) and the first sensing module 120. More specifically, for example, the second section S2 is made up by a line connecting the fourth vertex 110$d$ of the touch surface 110 and a switch point 110$b$' on the second side edge 114. The positions P' on the second section S2 includes the switch point 110$b$' and the fourth vertex 110$d$. The positions P' further include an intersecting point 110$c$' that a diagonal line connecting the first vertex 110$a$ and the third vertex 110$c$ forms with the connecting line (namely the second section S2). In other embodiments, the second section S2 and the positions P' on top thereof may be of other suitable setup methods and it should not be construed as a limitation to the invention. In addition, the second reference section L2, for example, passes through a brightest point, a mid point or other suitable reference points of each of the second reference light regions R2 and it should not be construed as a limitation to the invention. In order to make the diagram clearer, the reflection material is not illustrated in FIG. 5. The reflection material may be a reflective rod having reflective sheet strips or other suitable reflective component and adapted to be disposed at the positions P' to reflect the first light E1, and it should not be construed as a limitation to the invention.

Figure 7:
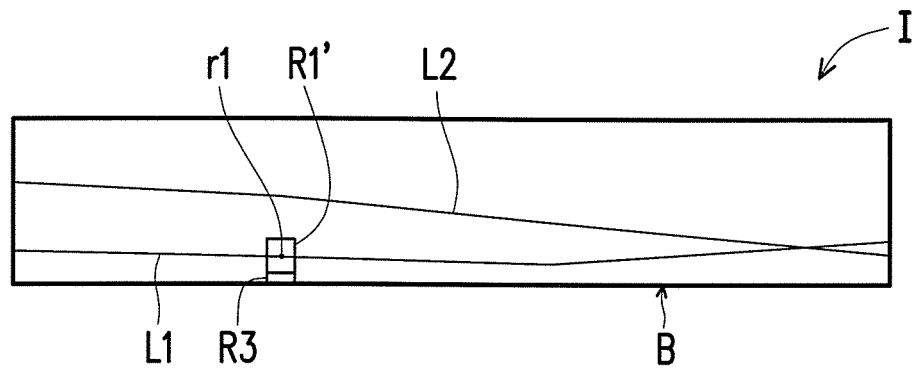
FIG. 7 illustrates a first input light region produced on the first reference section of FIG. 4.
Figure 8:
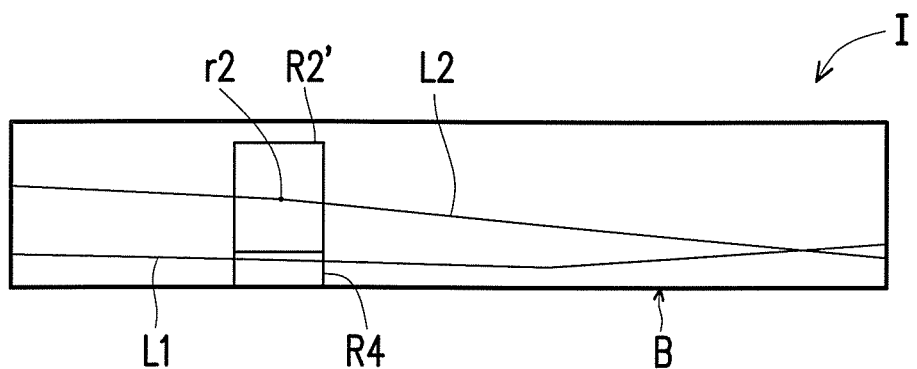
FIG. 8 illustrates a second input light region produced on the second reference section of FIG. 6.

FIG. 7 illustrates a first input light region produced on the first reference section of FIG. 4. FIG. 8 illustrates a second input light region produced on the second reference section of FIG. 6. In order to make the diagram clearer, FIG. 7 and FIG. 8 both have the first reference section L1 and the second reference section L2 illustrated at the same time. After the setup up for the above first reference section L1 and the second reference section L2 is completed, a user may perform touch operations to the touch surface 110. Here in the touch operation process, the touch object 50 is adapted to produce a first touch light region RF via the reflection of the first light E1 by the reflective part 52 (illustrated in FIG. 2) of the touch object 50 that is at a first touch region T1 (labelled in FIG. 1) between the first section S1 (labelled in FIG. 3) and the second section S2 (labelled in FIG. 5) as shown in FIG. 7. The first reference section L1 passes through the first touch light region R1' to define a first input light region r1, wherein the space taken up by the cushioning part 54 of the touch object 50 in the 2D sensing image I of FIG. 7 is labelled as R3. In addition, the touch object 50 is adapted to produce a second touch light region R2' via the reflection of the first light E1 by the reflective part 52 (illustrated in FIG. 2) of the touch object 50 that is at a second touch region T2 (labelled in FIG. 1) between the second section S2 (labelled in FIG. 5) and the first sensing module 120 as shown in FIG. 8. The second reference section L2 passes through the second touch light region R2' to define a second input light region r2, wherein the space taken up by the cushioning part 54 of the touch object 50 in the 2D sensing image I of FIG. 8 is labelled as R4. The optical touch system 100 obtains the position of the touch object 50 on the touch surface 110 according to the first input light region r1 or the second input light region r2. The first input light region r1 of the embodiment, for example, is a light point and the second input light region r2, for example, is a light point, however it should not be construed as a limitation to the invention.

It is worth to note, the space R3 taken up by the cushioning part 54 of the touch object 50 in the 2D sensing image I of FIG. 7 is smaller, and the space R4 taken up by the cushioning part 54 of the touch object 50 in the 2D sensing image I of FIG. 8 is larger. Therefore, the distance between the second touch light region R2' (shown in FIG. 8) and the border B of the 2D sensing image I is greater than the distance between the first touch light region R1' (shown in FIG. 7) and the border B of the 2D sensing image I such that the first reference section L1 is unable to pass through the second touch light region R2' shown in FIG. 8.

Bearing on the above, the optical touch system 100, aside to setting the first reference section L1 in the 2D sensing image I of the first sensing module 124, the second reference section L2 is further set in the 2D sensing image I. Wherein, the first reference section L1 corresponds to the first touch region T1 that is between the first section S1 and the second section S2 and the second reference section L2 corresponds to the second touch region T2 that is between the second section S2 and the first sensing module 120. In this way, if the touch object 50 is located within the second touch region T2 to be closer to the first light-sensing unit 124, which makes the space R4 taken up by the cushioning part 54 in the 2D sensing image I of the first light-sensing unit 124 is larger and covers the first reference section L1, causing the light (corresponding the second touch light region R2' of FIG. 8) reflected by the reflective part 52 that arrives at the first light-sensing unit 124 to be unable to fall on the first reference section L1 as shown in FIG. 8, then the optical touch system 100 may be changed to perform sensing of the touch object 50 according to the second reference section L2 that is not covered by the space R4 taken up by the cushioning part 54 in the 2D sensing image I. Now, the light (corresponding to the second touch light region R2' of FIG. 8) reflected by the reflective part 52 may fall on the second reference section L2 after arriving at the first light-sensing unit 124 such that light reflected may be reliably sensed.

More specifically, when the touch object 50 performs a touch input at the first touch region T1 of the touch surface 110, the first light-sensing unit 124 may be set to sense the touch object 50 only according to the first reference section L1. On the other hand, when the touch object 50 performs a touch input at the second touch region T2 of the touch surface 110, the first light-sensing unit 124 may be set to sense the touch object 50 only according to the second reference section L2. In this way, the first light-sensing unit 124 does not need to perform sensing according to the first reference section L1 and the second reference section L2 at the same time and the sensing efficiency of the first light-sensing unit 124 may be enhanced.

Figure 9:
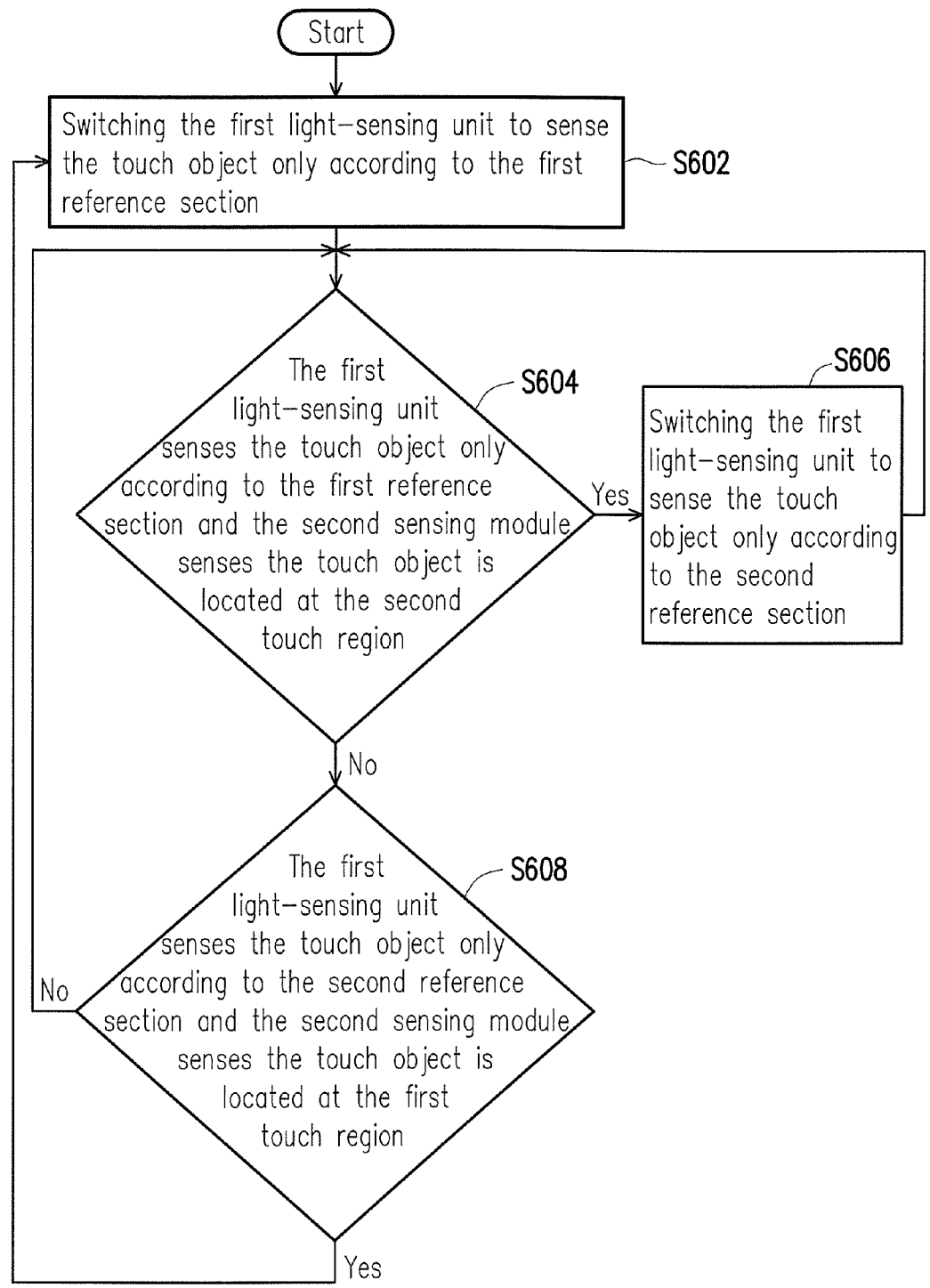
FIG. 9 is a flow chart of switching the first reference section and the second reference section of FIG. 7.

FIG. 9 is a flow chart of switching the first reference section and the second reference section of FIG. 7. Referring to FIG. 9, for example, the initial setup of the optical touch system 100 is to switch the first light-sensing unit 124 to sense the touch object 50 only according to the first reference section L1 (step S602). When the first light-sensing unit 124 senses the touch object 50 only according to the first reference section L1 and the second sensing module 130 senses the touch object 50 is located at the second touch region T2 (shown in FIG. 1) between the second section S2 and the first light-sensing unit 124 to be closer to the first sensing module 120 (step S604), the optical touch system 100 switches the first light-sensing unit 124 to sense the touch object 50 only according to the second reference section L2 (step S606), such that the first light-sensing unit 124 is able to perform sensing of the touch object 50 reliably. On the other hand, when the first light-sensing unit 124 senses the touch object 50 only according to the second reference section L2 and the second sensing module 130 senses the touch object 50 is located at the first touch region T1 (shown in FIG. 1) between the first section S1 and the second section S2 to be further from the first sensing module 120 (step S608), the optical touch system 100 switches the first light-sensing unit 124 to sense the touch object 50 only according to the first reference section L1 (step S602), such that the first light-sensing unit 124 is able to perform sensing of the touch object 50 reliably.

The second sensing module 130 shown in FIG. 1 is arranged in a way symmetrical to the first sensing module 120, and the method of using the second sensing module 130 is similar to the above method of using the first sensing module 120 and will not be repeated here. The problem where the touch object is excessively close to the light sensing unit and unable to be successfully sensed may be solved by the above arrangement and method of using the first sensing module 120 and a similar arrangement and method for using the second sensing module 130, such that the optical touch system 100 obtains the location of the touch object 50 by the first sensing module 120 sensing the light reflected by the touch object 50 accompanied with the second sensing module 130 sensing the light reflected by the touch object 50, so as to achieve good touch sensing effect.

Below, a method for setting up the switch point 110b' shown in FIG. 5 is described. When the touch object 50 shown in FIG. 1 is located between the second vertex 110b and a critical point C on the second side edge 114 to be further from the first light-sensing unit 124, the touch object 50 is adapted to reflect the first light E1 and produce the first touch light region R1' at the 2D sensing image I as shown in FIG. 7, and the first reference section L1 passes through the first touch light region R1' to define the first input light region r1. When the touch object 50 is located between the first vertex 110a and the critical point C on the second side edge 114 to be closer to the first light-sensing unit 124, the touch object 50 is adapted to reflect the first light E1 and produce the second touch light region R2' at the 2D sensing image I as shown in FIG. 8, and the first reference section L1 does not pass through the second touch light region R2' and the second reference section L2 passes through the second touch light region R2' to define the first input light region r2. Namely, the critical point C is the critical position where whether the light reflected by the touch object 50 falls on the first reference section L1. Bearing on the above, the switch point 110b' shown in FIG. 5, for example, coincides with the critical point C shown in FIG. 1 to reliably switch the first reference section L1 and the second reference section L2 using the critical point C as the critical position. Thus, the first reference section L1 is used to determine the touch object 50 under the circumstance when the touch object 50 is located below the line connecting the fourth vertex 110d and the switch point 110b' (namely the touch object 50 is located at the first touch region T1 shown in FIG. 1), and the second reference region L2 is used to determine the touch object 50 under the circumstance when the touch object 50 is located above the line connecting the fourth vertex 110d and the switch point 110b' (namely the touch object is located at the second touch region T2 shown in FIG. 1). In other embodiments, the switch point 110b' also may be located below the critical point C and it should not be construed as a limitation to the invention.

In other embodiments, the numbers of touch objects 50 may be a plurality. When the touch objects 50 are performing touch inputs on the touch surface 110 at the same time, the first light-sensing unit 124 may sense the touch objects 50 according to the first reference section L1 and the second reference section L2 at the same time to achieve multi-touch effect.

Figure 10:
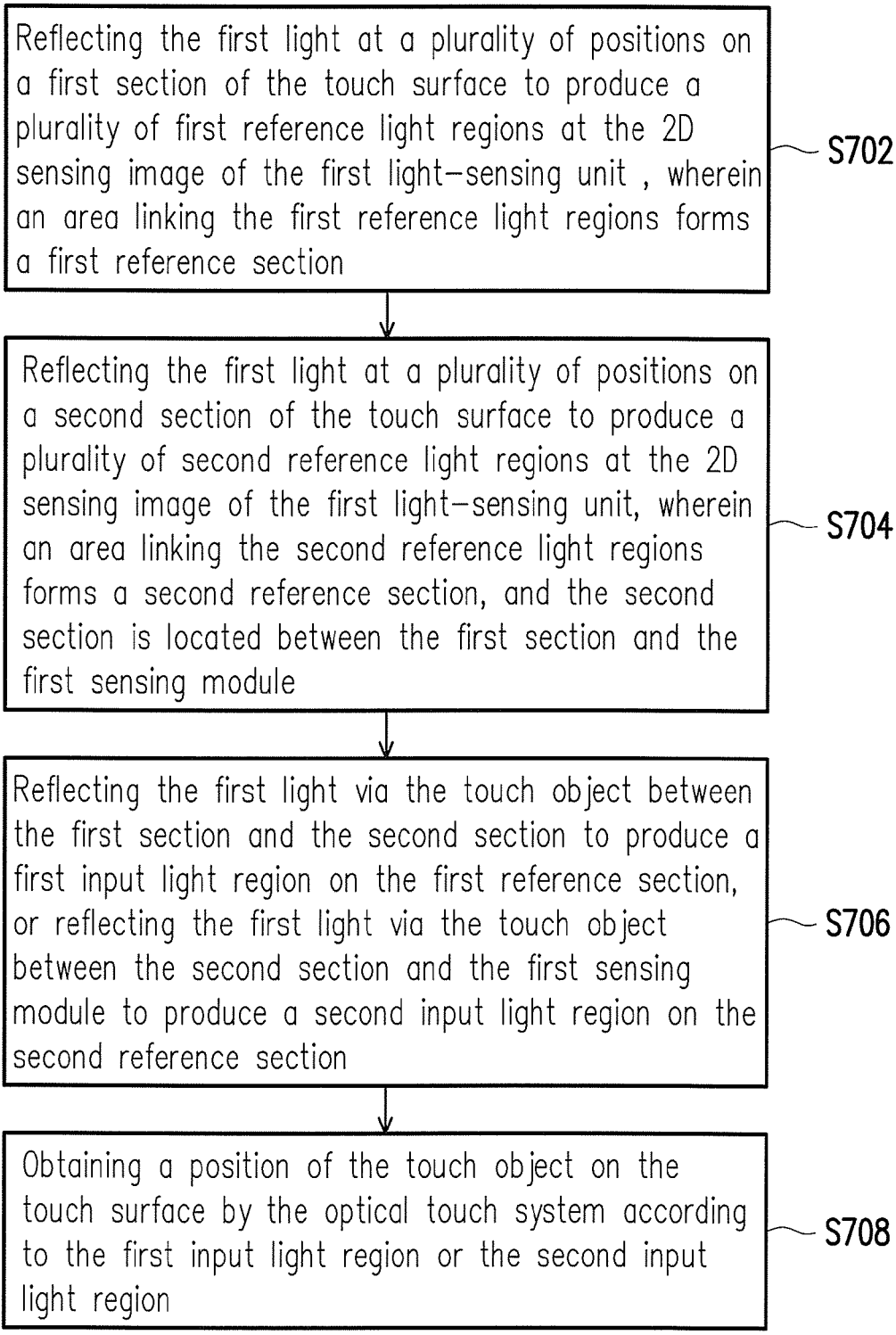
FIG. 10 is a flow chart of a using method of the optical touch system of FIG. 1.

Below, a using method of the optical touch system 100 of the embodiment is described accompanied by diagram. FIG. 10 is a flow chart of a using method of the optical touch system of FIG. 1. Referring to FIG. 10, reflecting the first light E1 via the reflection material at the plurality of positions P on the first section S1 of the touch surface 110 to produce a plurality of first reference light regions R1 at the 2D sensing image I of the first light-sensing unit 124, wherein the area linking the first reference light regions R1 form the first reference section L1 (step S702). Reflecting the first light E1 via the reflection material at the plurality of positions P' on a second section S2 of the touch surface 110 to produce a plurality of second reference light regions R2 at the 2D sensing image I of the first light-sensing unit 124, wherein the area linking the second reference light regions R2 form a second reference section L2, and the second section S2 is located between the first section S1 and the first sensing module 120 (step S704). Reflecting the first light E1 via the touch object 50 between the first section S1 and the second section S2 to produce the first input light region r1 on the first reference section L1, or reflecting the first light E1 via the touch object 50 between the second section S2 and the first sensing module 120 to produce a second input light region r2 on the second reference section L2 (step S706). Obtaining the location of the touch object 50 on the touch surface 110 by the optical touch system 100 according to the first input light region r1 or the second input light region r2 (step S708). The above step S702 and the step S704, for example, is a one time setting to be performed to the optical touch system 100 by the manufacturing end, and the above step S706 and the step S708, for example, is a flow for a determination of the touch system when a consumer performs a touch to the optical touch system 100, however the invention is not limited thereto.

In summary, in an optical touch system of the invention, in addition to setting a first reference section in a 2D sensing image of a first light-sensing unit, here a second reference section is further set in the 2D sensing image, wherein the first reference section corresponds to a first touch region between the first section and the second section and the second reference section corresponds to a second touch region between the second section and a first sensing module. In this way, under the circumstance where a cushioning part that is used to contact a touch surface is disposed below a reflective part of a touch object, if the touch object is located in the second touch region to be closer to a first light-sensing unit, which makes the space taken up by the cushioning part in the 2D sensing image of the first light-sensing unit larger and covers the first reference section, causing a light reflected by the reflective part that arrives at the first light-sensing unit to be unable to fall on the first reference section L1, then the optical touch system may be changed to perform sensing of the touch object according to the second reference section that is not covered by the space taken up by the cushioning part in the 2D sensing image, so as to solve the problem of the touch object being excessively close to the light-sensing unit and not able to be successfully sensed, making the optical touch system have good touch sensing effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical touch system, for performing touch input by at least one touch object, the optical touch system comprising:
   a touch surface, the at least one touch object performs touch input on the touch surface; and
   a first sensing module, arranged at a periphery of the touch surface and comprising a first light source and a first light-sensing unit, wherein the first light-sensing unit is used to obtain a two-dimensional sensing image, the two-dimensional sensing image has a first reference section and a second reference section, the first light source emits a first light, the first light is reflected at a plurality of positions on a first section of the touch surface to produce a plurality of first reference light regions at the two-dimensional sensing image of the first light-sensing unit, the first reference section is an area linking the first reference light regions, the first light is reflected at a plurality of positions on a second section of the touch surface to produce a plurality of second reference light regions at the two-dimensional sensing image of the first light-sensing unit, the second reference section is an area linking the second reference light regions, and the second section is located between the first section and the first sensing module,
   wherein the at least one touch object reflects the first light between the first section and the second section to produce a first input light region on the first reference section, the at least one touch object reflects the first light between the second section and the first sensing module to produce a second input light region on the second reference section, and the optical touch system obtains a location of the at least one touch object on the touch surface according to the first input light region or the second input light region.

2. The optical touch system as claimed in claim 1, wherein a border of the two-dimensional sensing image of the first light-sensing unit corresponds to the touch surface, the at least one touch object has a reflective part and a cushioning part, the cushioning part contacts the touch surface to be positioned between the touch surface and the reflective part, when the at least one touch object is located between the first section and the second section, the reflective part reflects the first light to produce a first touch light region at the two-dimensional sensing image of the first light-sensing unit, when the at least one touch object is located between the second section and the first sensing module, the reflective part reflects the first light to produce a second touch light region at the two-dimensional sensing image of the first light-sensing unit, a distance between the second touch light region and the border is greater than a distance between the first touch light region and the border, the first reference section passes through the first touch light region to define the first input light region, and the second reference section passes through the second touch light region to define the second input light region.

3. The optical touch system as claimed in claim 1, wherein the touch surface is rectangular and has a first side edge, a second side edge, a third side edge and a fourth side edge connected sequentially, and has a first vertex between the first side edge and the second side edge, has a second vertex between the second side edge and the third side edge, has a third vertex between the third side edge and the fourth side edge, and has a fourth vertex between the fourth side edge and the first side edge.

4. The optical touch system as claimed in claim 3, wherein the first sensing module is arranged at the first vertex, the first section is made up by the third side edge and the fourth side edge, and the second section is made up by a line connecting the fourth vertex and a switch point on the second side edge.

5. The optical touch system as claimed in claim 4, wherein the positions on the first section comprise the second vertex, the third vertex and the fourth vertex.

6. The optical touch system as claimed in claim 4, wherein the positions on the second section comprise the switch point and the fourth vertex.

7. The optical touch system as claimed in claim 6, wherein when the at least one touch object is located between the second vertex and a critical point on the second side edge, the at least one touch object reflects the first light to produce a first touch light region at the two-dimensional sensing image of the first light-sensing unit, and the first reference section passes through the first touch light region to define the first input light region, and when the at least one touch object is located between the first vertex and the critical point on the second side edge, the at least one touch object reflects the first light to produce a second touch light region at the two-dimensional sensing image of the first light-sensing unit, the first reference section does not pass through the second touch light region, and the second reference section passes through the second touch light region to define the second input light region.

8. The optical touch system as claimed in claim 7, wherein the switch point coincides with the critical point.

9. The optical touch system as claimed in claim 6, wherein the positions on the second section further comprise any point on a line connecting the fourth vertex and the switch point.

10. The optical touch system as claimed in claim 1, wherein when the at least one touch object performs a touch input on the touch surface, the first light-sensing unit senses the at least one touch object only according to the first reference section or senses the at least one touch object only according to the second reference section.

11. The optical touch system as claimed in claim 10, comprising a second sensing module, wherein the second sensing module is arranged at the periphery of the touch surface, when the first light-sensing unit senses the at least one touch object only according to the first reference section and the second sensing module senses the at least one touch object is located between the second section and the first sensing module, the first light-sensing unit is switched to sense the at least one touch object only according to the second reference section, and when the first light-sensing unit senses the at least one touch object only according to the second reference section and the second sensing module senses the at least one touch object is located between the first section and the second section, the first light-sensing unit is switched to sense the at least one touch object only according to the first reference section.

12. The optical touch system as claimed in claim 11, wherein the touch surface is rectangular, and the first sensing module and the second sensing module are arranged at two adjacent vertexes of the touch surface respectively.

13. The optical touch system as claimed in claim 1, wherein a number of the at least one touch object is a plurality, when the touch objects perform touch inputs on the touch surface at the same time, the first light-sensing unit senses the touch objects according to the first reference section and the second reference section at the same time.

14. A using method of an optical touch system, the optical touch system comprising a touch surface and a first sensing module, the first sensing module comprising a first light source and a first light-sensing unit, the first light source emits a first light, the first light-sensing unit is used to obtain a two-dimensional sensing image, at least one touch object performs touch input on the touch surface, the using method comprising:
　　reflecting the first light at a plurality of positions on a first section of the touch surface to produce a plurality of first reference light regions at the two-dimensional sensing image of the first light-sensing unit, wherein an area linking the first reference light regions forms a first reference section;
　　reflecting the first light at a plurality of positions on a second section of the touch surface to produce a plurality of second reference light regions at the two-dimensional sensing image of the first light-sensing unit, wherein an area linking the second reference light regions forms a second reference section, and the second section is located between the first section and the first sensing module;
　　reflecting the first light via the at least one touch object between the first section and the second section to produce a first input light region on the first reference section, or reflecting the first light via the at least one touch object between the second section and the first sensing module to produce a second input light region on the second reference section; and
　　obtaining a position of the at least one touch object on the touch surface by the optical touch system according to the first input light region or the second input light region.

15. The using method of the optical touch system as claimed in claim 14, wherein a border of the two-dimensional sensing image of the first light-sensing unit corresponds to the touch surface, the at least one touch object has a reflective part and a cushioning part, the cushioning part contacts the touch surface to be positioned between the touch surface and the reflective part, and a method for producing the first input light region and the second input light region comprises:
　　when the at least one touch object is located between the first section and the second section, reflecting the first light by the reflective part to produce a first touch light region at the two-dimensional sensing image of the first light-sensing unit; and
　　when the at least one touch object is located between the second section and the first sensing module, reflecting the first light by the reflective part to produce a second touch light region at the two-dimensional sensing image of the first light-sensing unit, wherein a distance between the second touch light region and the border is greater than a distance between the first touch light region and the border, the first reference section passes through the first touch light region to define the first input light region, and the second reference section passes through the second touch light region to define the second input light region.

16. The using method of the optical touch system as claimed in claim 14, comprising:
　　Sensing the at least one touch object by the first light-sensing unit only according to the first reference section or sensing the at least one touch object by the first light-sensing unit only according to the second reference section.

17. The using method of the optical touch system as claimed in claim 16, wherein the optical touch system comprises a second sensing module, and a method for sensing the at least one touch object by the first light-sensing unit only according to the first reference section or sensing the at least one touch object by the first light-sensing unit only according to the second reference section comprises:
   when the first light-sensing unit senses the at least one touch object only according to the first reference section and the second sensing module senses the at least one touch object is located between the second section and the first sensing module, switching the first light-sensing unit to sense the at least one touch object only according to the second reference section; and
   when the first light-sensing unit senses the at least one touch object only according to the second reference section and the second sensing module senses the at least one touch object is located between the first section and the second section, switching the first light-sensing unit to sense the at least one touch object only according to the first reference section.

18. The using method of the optical touch system as claimed in claim 14, wherein a number of the at least one touch object is a plurality, the method comprises:
   when the touch objects perform touch inputs on the touch surface at the same time, sensing the touch objects by the first light-sensing unit according to the first reference section and the second reference section at the same time.

* * * * *